May 10, 1966 F. O. LUENBERGER 3,250,141
VARIABLE RATIO TRANSMISSION MECHANISM
Filed Nov. 19, 1963 12 Sheets-Sheet 1
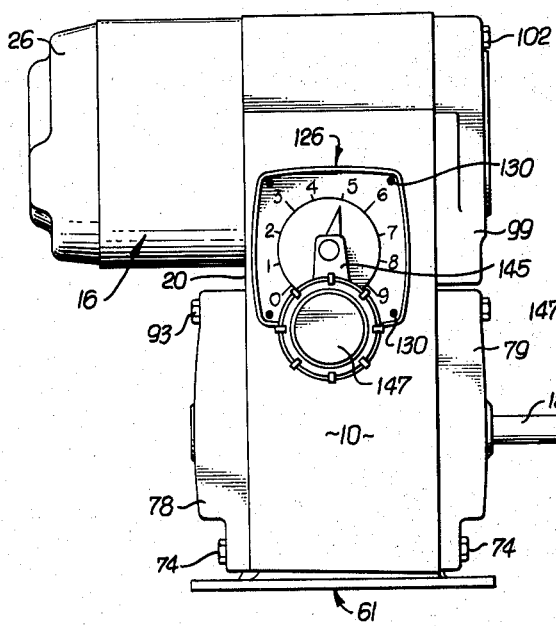
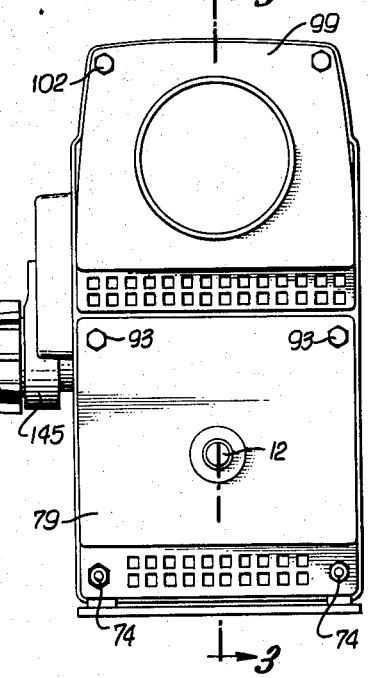
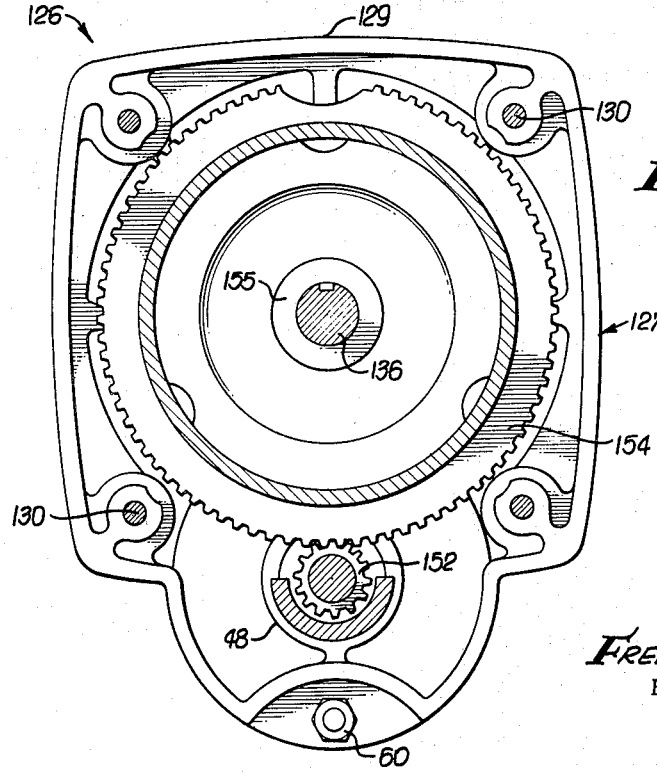
INVENTOR.
FREDERICK O. LUENBERGER
BY
Flam and Flam
ATTORNEYS.

May 10, 1966 F. O. LUENBERGER 3,250,141
VARIABLE RATIO TRANSMISSION MECHANISM
Filed Nov. 19, 1963 12 Sheets-Sheet 2

INVENTOR.
FREDERICK O. LUENBERGER
BY
Flam and Flam
ATTORNEYS.

INVENTOR.
FREDERICK O. LUENBERGER
BY
Flam and Flam
ATTORNEYS.

May 10, 1966 F. O. LUENBERGER 3,250,141
VARIABLE RATIO TRANSMISSION MECHANISM
Filed Nov. 19, 1963 12 Sheets-Sheet 4

INVENTOR.
FREDERICK O. LUENBERGER
BY
Flam and Flam
ATTORNEYS.

May 10, 1966

F. O. LUENBERGER 3,250,141

VARIABLE RATIO TRANSMISSION MECHANISM

Filed Nov. 19, 1963

INVENTOR.
FREDERICK O. LUENBERGER
BY
Flam and Flam
ATTORNEYS.

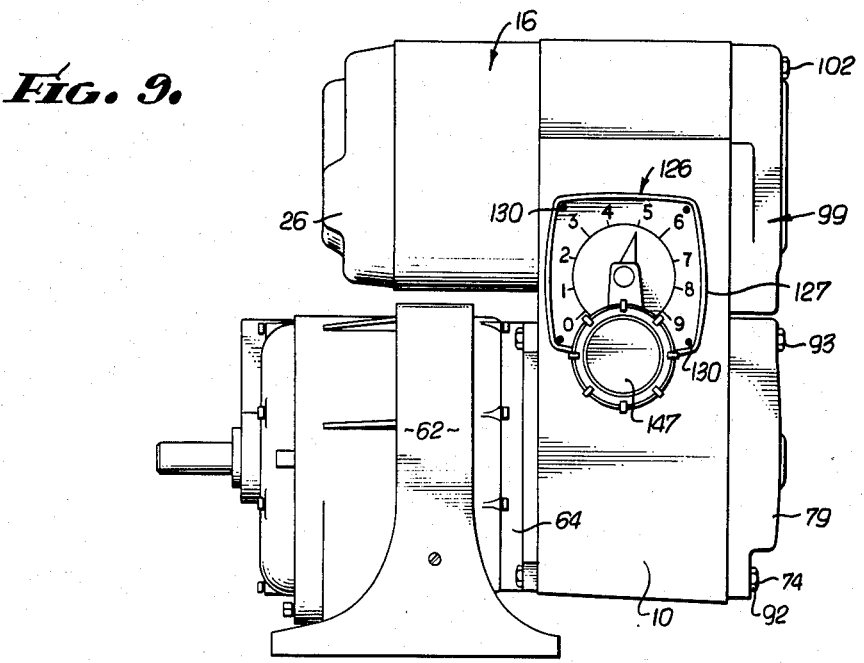
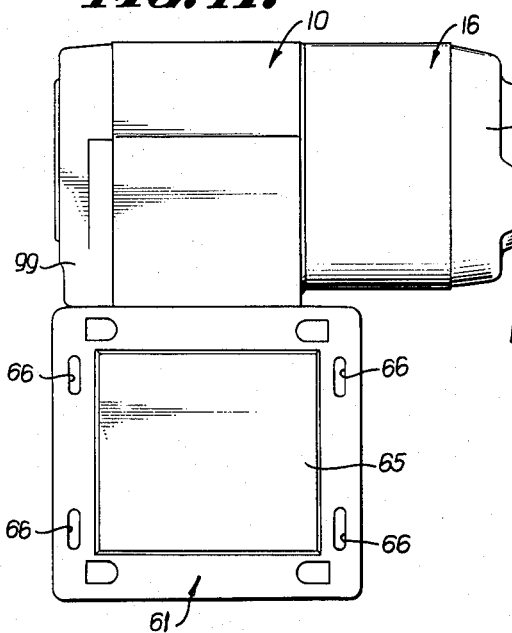
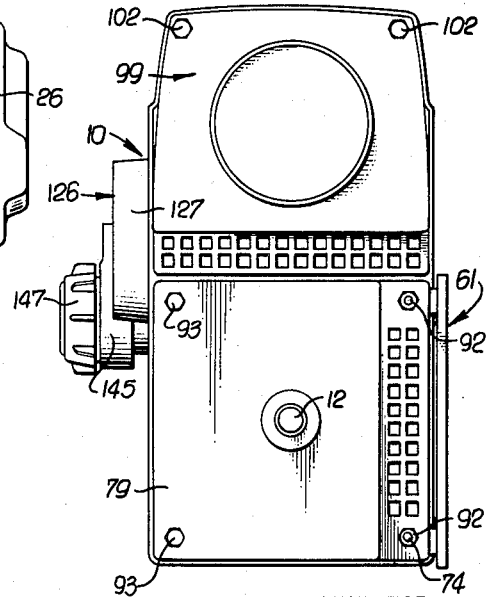

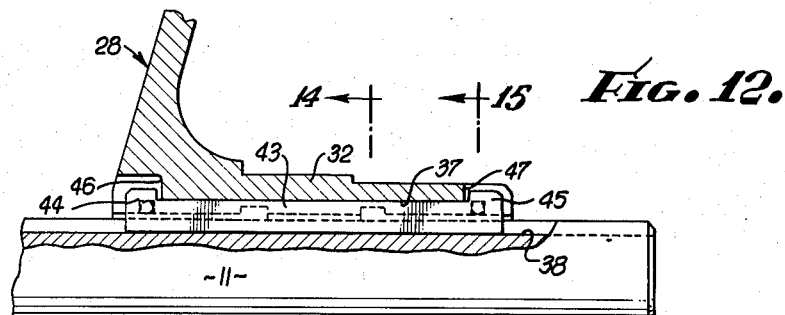
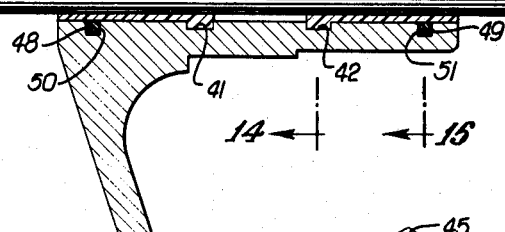
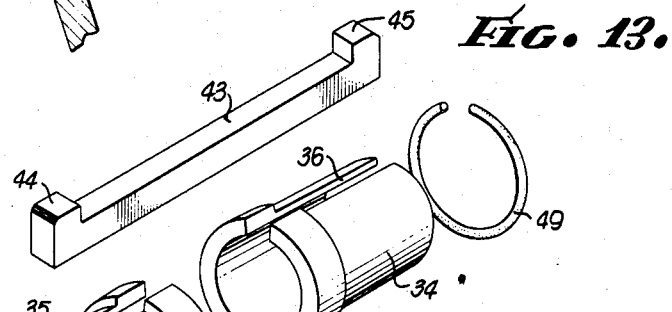
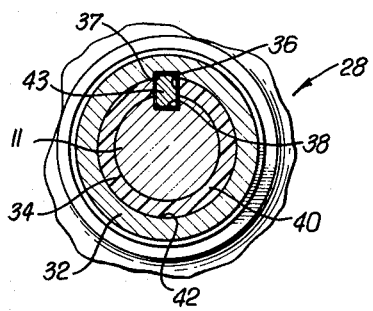
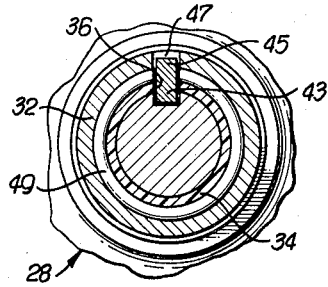
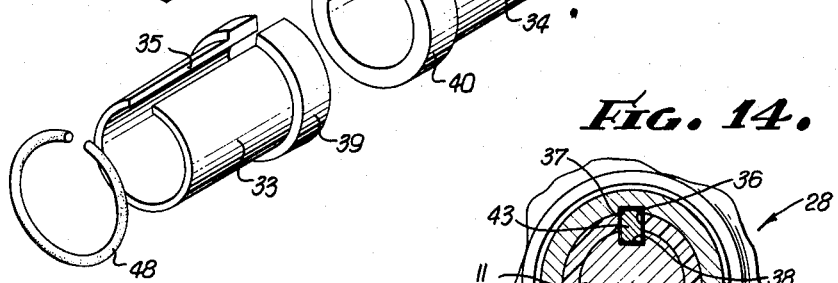

FREDERICK O. LUENBERGER
INVENTOR.

BY
Flam and Flam
ATTORNEYS.

May 10, 1966 F. O. LUENBERGER 3,250,141
VARIABLE RATIO TRANSMISSION MECHANISM
Filed Nov. 19, 1963 12 Sheets-Sheet 9
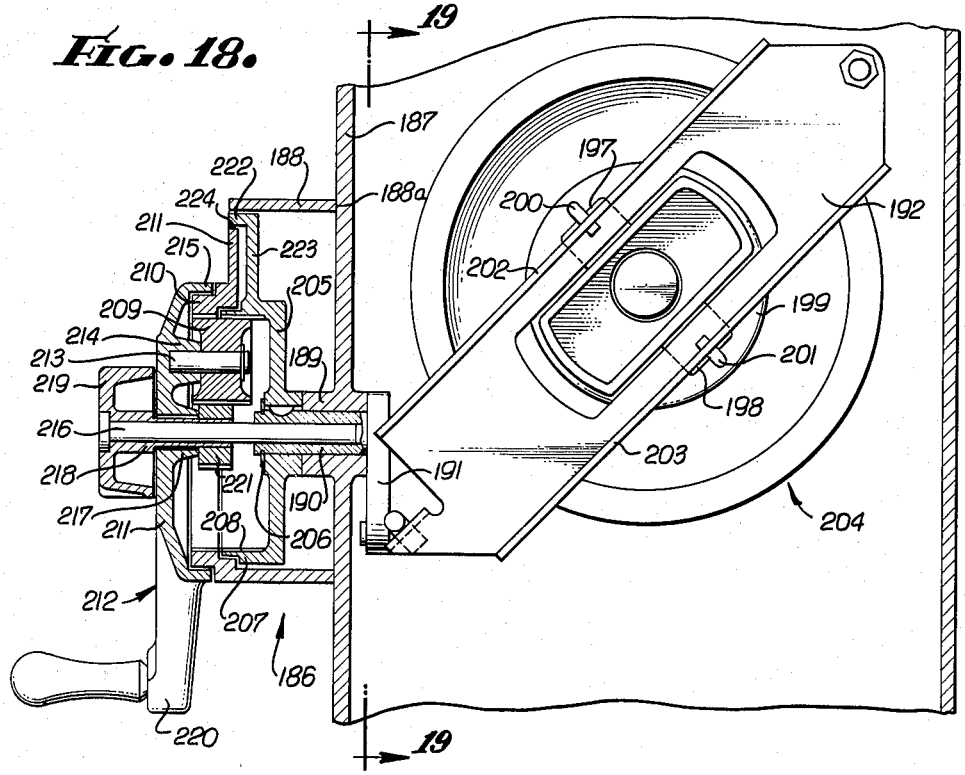
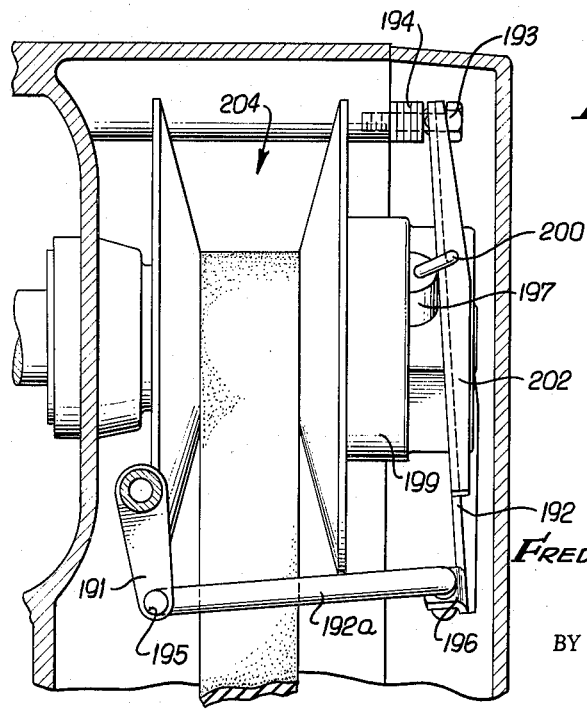
FREDERICK O. LUENBERGER
INVENTOR.
BY
Flam and Flam
ATTORNEYS.

May 10, 1966 F. O. LUENBERGER 3,250,141
VARIABLE RATIO TRANSMISSION MECHANISM
Filed Nov. 19, 1963 12 Sheets-Sheet 10
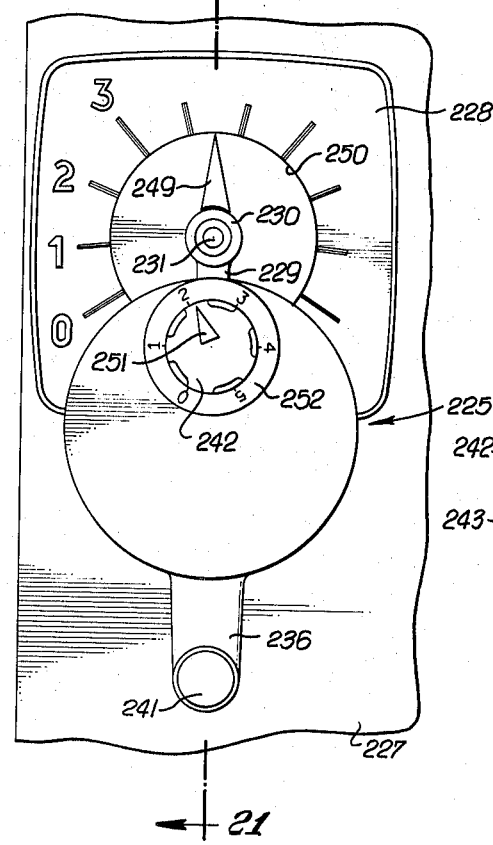
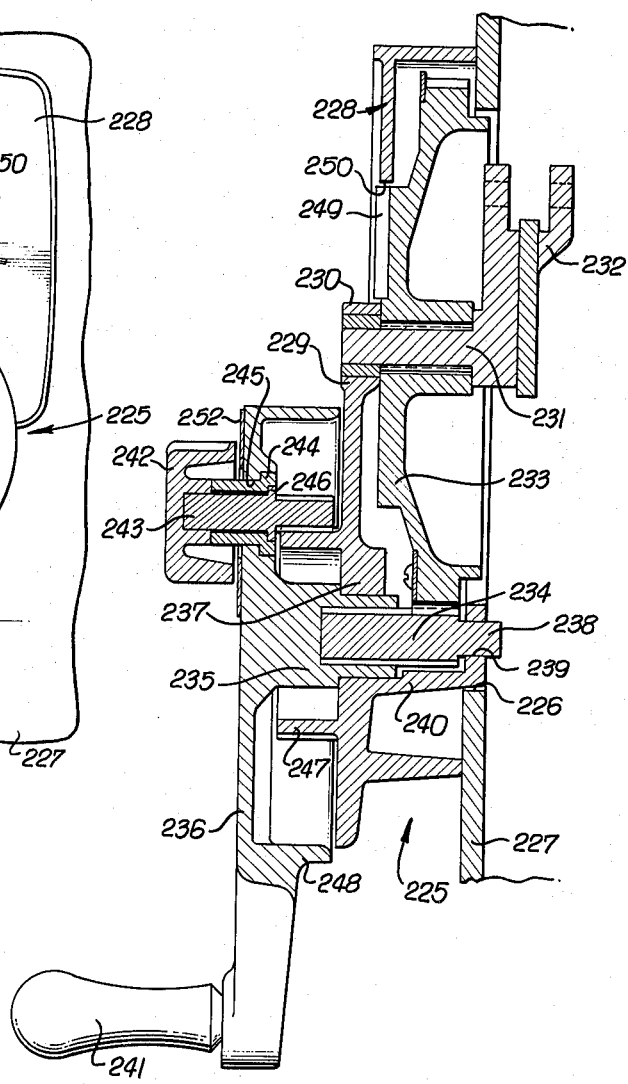
FREDERICK O. LUENBERGER
INVENTOR.
BY
Flam and Flam
ATTORNEYS.

May 10, 1966     F. O. LUENBERGER     3,250,141

VARIABLE RATIO TRANSMISSION MECHANISM

Filed Nov. 19, 1963     12 Sheets-Sheet 11

INVENTOR
FREDERICK O. LUENBERGER
BY
Flam and Flam
ATTORNEYS.

INVENTOR.
FREDERICK O. LUENBERGER
BY
Flam and Flam
ATTORNEYS.

United States Patent Office 3,250,141
Patented May 10, 1966

3,250,141
VARIABLE RATIO TRANSMISSION MECHANISM
Frederick O. Luenberger, Los Angeles, Calif., assignor to Emerson Electric Co., a corporation of Missouri
Filed Nov. 19, 1963, Ser. No. 324,802
23 Claims. (Cl. 74—230.17)

This invention relates to variable ratio transmissions of the type utilizing variable diameter pulley structures on a driving shaft and a driven shaft, with the pulley structures connected together by a flexible belt.

The pulley structure on the driving shaft of transmissions of this character customarily have one or more movable pulley sections with conical faces engaging the edges of the flexible belt. Mechanisms for adjusting the movable pulley sections must necessarily absorb substantial thrusts. Commonly such adjusting mechanisms are carried by an end bracket opposite the driving motor or on an adapter collar interposed between the drive motor and the frame. These brackets or rings are necessarily designed to sustain heavy thrusts. One of the objects of this invention is to provide a new structure for adjusting the transmission ratio whereby the substantial thrusts are directly transmitted to the frame of the transmission independent of end brackets or adapter rings. The end brackets are thus simplified and adapter rings are unnecessary.

Another object of this invention is to provide a transmission mechanism in which the driving shaft is rotatably supported at the motor end only so that the end bracket opposite the motor serves merely as a cap.

Another object of this invention is to provide a new variable ratio transmission of this character in which the control unit is conveniently mounted on and accessibly located at the side wall of the transmission frame.

Another object of this invention is to provide a unique shifting lever operated by such control unit. For this purpose, the shifting lever is fulcrumed at a corner of the frame radially beyond the pulley structure. The lever extends diagonally across the free end of the shaft to engage a shifting collar or the like carried by the shaft. The end of the lever opposite the fulcrum is moved along the interior wall of the frame by the aid of a chain or other linkage mechanism of the control unit.

Still another object of this invention is to provide a shift lever of this character that produces a balanced thrust upon the shifting collar, thus ensuring against any binding of the parts, or undue load upon the bearing supporting the shifting collar.

Another object of this invention is to provide a unique shifting lever and control unit so situated that the pulley structures are readily accessible for replacement or repair merely by removal of the shifting lever.

Still another object of this invention is to provide simple means for detachably mounting the shifting lever on the frame and simple means for detachably connecting the shifting lever to the control unit.

Still another object of this invention is to provide a shifting lever having a unique overload protection feature. For this purpose, a spring urges the lever against its fulcrum, and exerts a force normally adequate to maintain it in place. However, should the reaction on the shift lever increase suddenly, as for example, when the transmission is started, the spring yields momentarily and precludes undue strain upon the control unit.

Still another object of this invention is to provide a simple control unit for operating a shifting lever having an angularly movable knob or handle in which, by simple means, the relationship between ratio of transmission and angular position of the knob or handle is made linear.

Still another object of this invention is to provide an adjusting mechanism for a transmission of this character that can readily be calibrated. For this purpose, the fulcrum point of the shift lever can readily be shifted by virtue of its simplified mounting.

Still another object of this invention is to provide a new adjusting mechanism for a variable ratio transmission of this character that can be selectively mounted at either side of the frame, depending upon the requirements of installation. To accomplish this object, the shift lever may readily be fulcrumed at either corner of the frame by a simple stud or screw.

Still another object of this invention is to provide an adjusting mechanism of this character that incorporates simple yet effective means for counterbalancing the thrust imposed on the adjusting structure through the shifting lever whereby the mechanism is easily adjusted by hand and whereby the mechanism maintains its setting.

Still another object of this invention is to provide a compact adjusting mechanism having separate knobs or handles for coarse and fine adjustments in the setting of the transmission.

Still another object of this invention is to provide a control mechanism for a variable ratio transmission capable, in a simple manner, of operating from two independent controls. For this purpose, the center of the shifting lever engages the shifting collar, and independent controls serve to move opposite ends of the lever. Each control is capable of angularly moving the lever about the other as a fulcrum point. By such mechanism, one control may be operated automatically, as for example, in response to system demands, and other may serve as a manual override for emergency or other use. Optionally, one control may be used for trimming or adjustment purposes; or both controls may be under automatic control whereby the effects of two system variables are combined; or one of the controls may be used in a feedback loop, as for example, to maintain output speed constant as a function of load.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a side elevational view of a variable transmission mechanism incorporating the present invention;

FIG. 2 is an end elevational view thereof;

FIG. 5 is a further enlarged transverse sectional view of the control unit taken along a plane corresponding to line 5—5 of FIG. 4;

FIG. 9 is a side elevational view similar to FIG. 1, illustrating the transmission frame mounted on a gear mechanism;

FIG. 10 is an end elevational view similar to FIG. 2, but illustrating the mounting base in an alternate position;

FIG. 11 is a side elevational view of the apparatus shown in FIG. 10;

FIG. 12 is a further enlarged fragmentary axial sectional view showing the bushing structure for one of the slidable pulley elements;

FIG. 13 is an exploded pictorial view illustrating components of the bushing structure;

Figure 7:
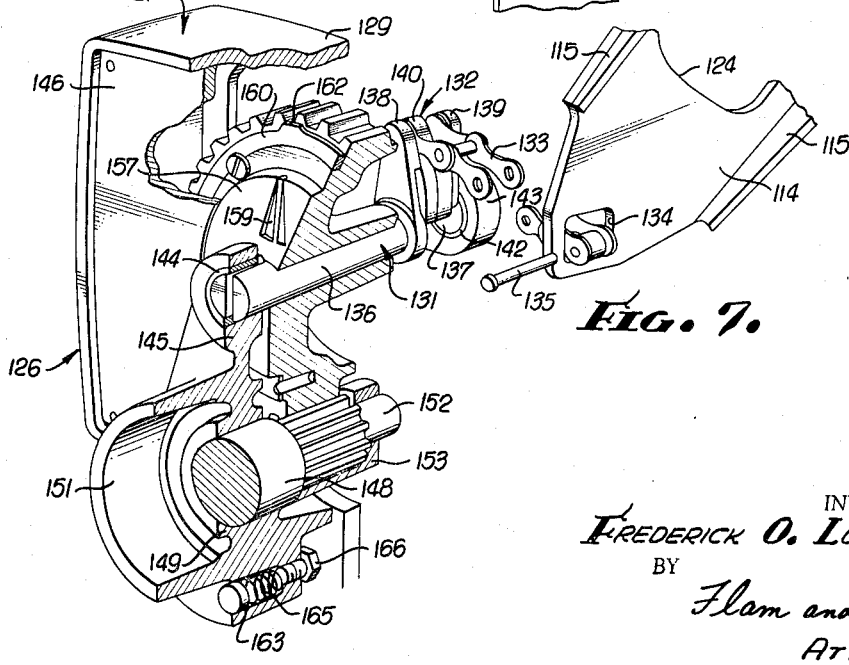
FIG. 7 is a fragmentary pictorial view showing some of the parts of the control unit broken away and in section.
Figure 16:
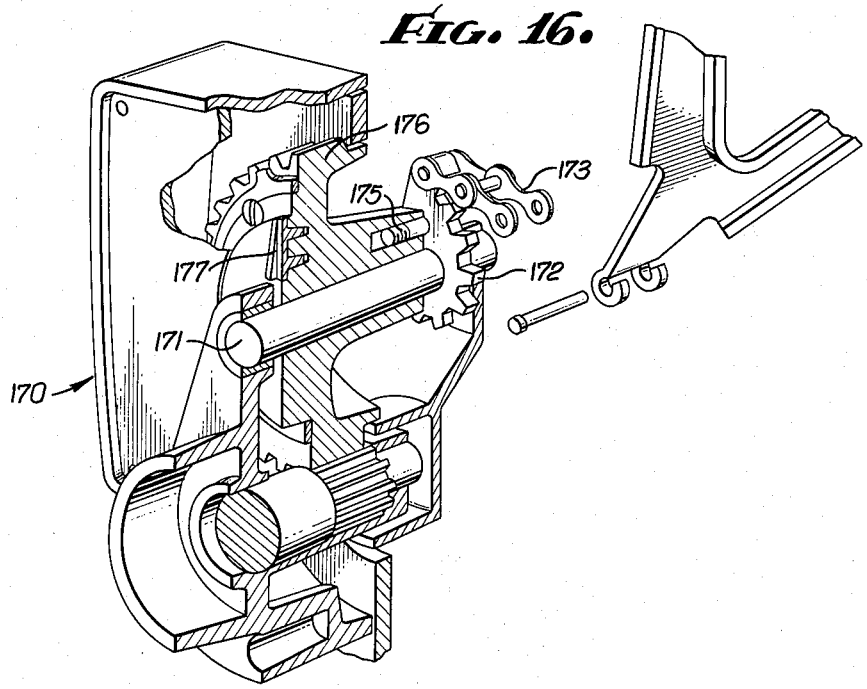
Figure 17:
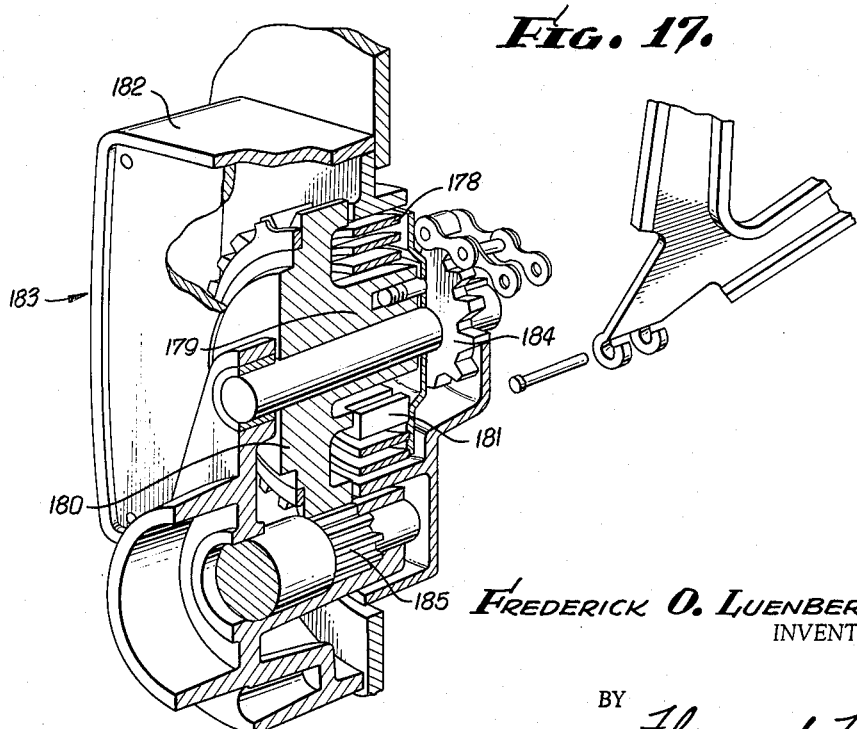
Figure 22:
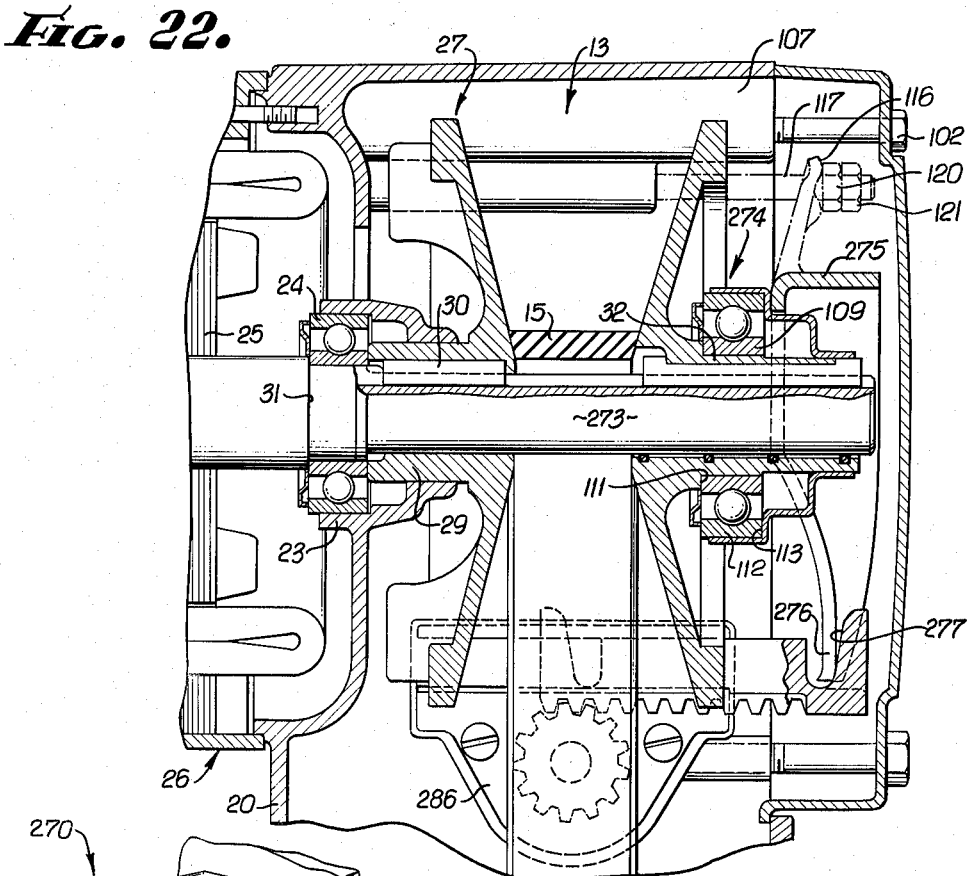
Figure 23:
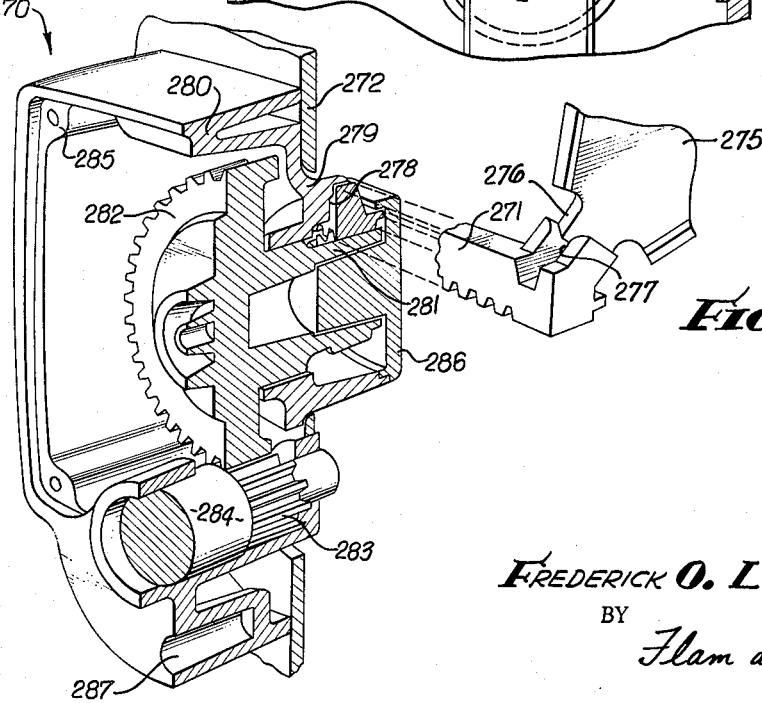
Figure 24:
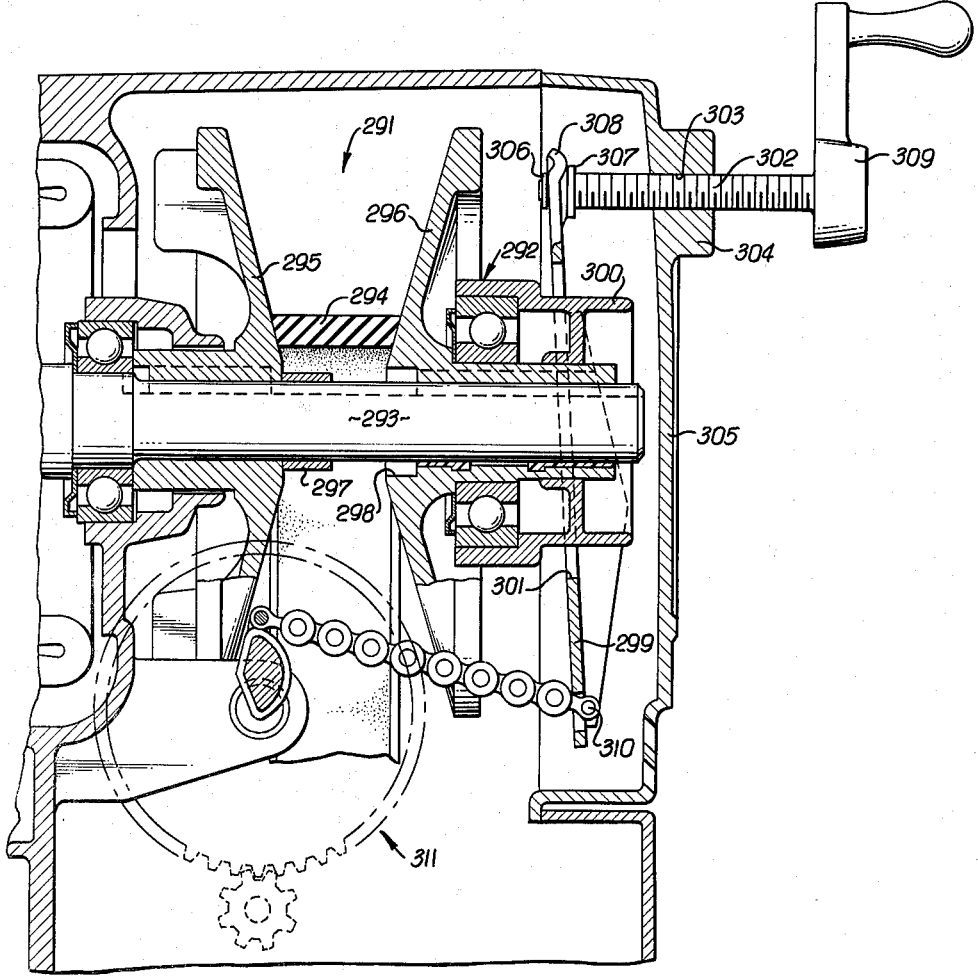
Figure 25:
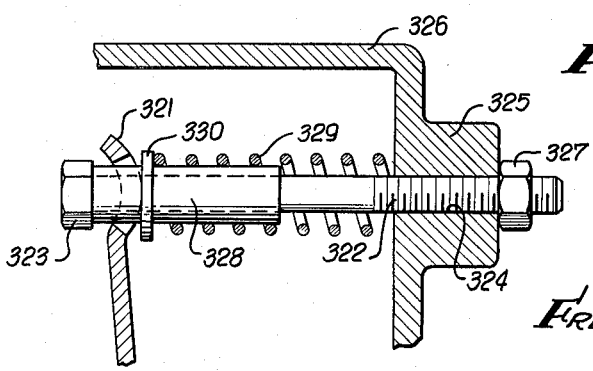

FIGS. 14 and 15 are sectional views taken along planes corresponding, respectively, to lines 14—14 and 15—15 of FIG. 12;

FIGS. 16 and 17 are views similar to FIG. 7, each illustrating modified control units;

FIG. 18 is a fragmentary sectional view illustrating a modified control unit;

FIG. 19 is a fragmentary sectional view taken along a plane corresponding to line 19—19 of FIG. 18;

FIG. 20 is a front elevational view of another modified control unit, and a fragment of the adjoining transmission frame;

FIG. 21 is an enlarged sectional view taken along a plane corresponding to line 21—21 of FIG. 20;

FIG. 22 is a fragmentary axial sectional view illustrating a modified mechanism;

FIG. 23 is a pictorial view of the control unit forming a part of the mechanism illustrated in FIG. 22, part of the apparatus being broken away and shown in section; and FIGS. 24 and 25 are fragmentary sectional views each illustrating modified arrangements for controlling the position of a variable diameter pulley structure.

Figure 3:
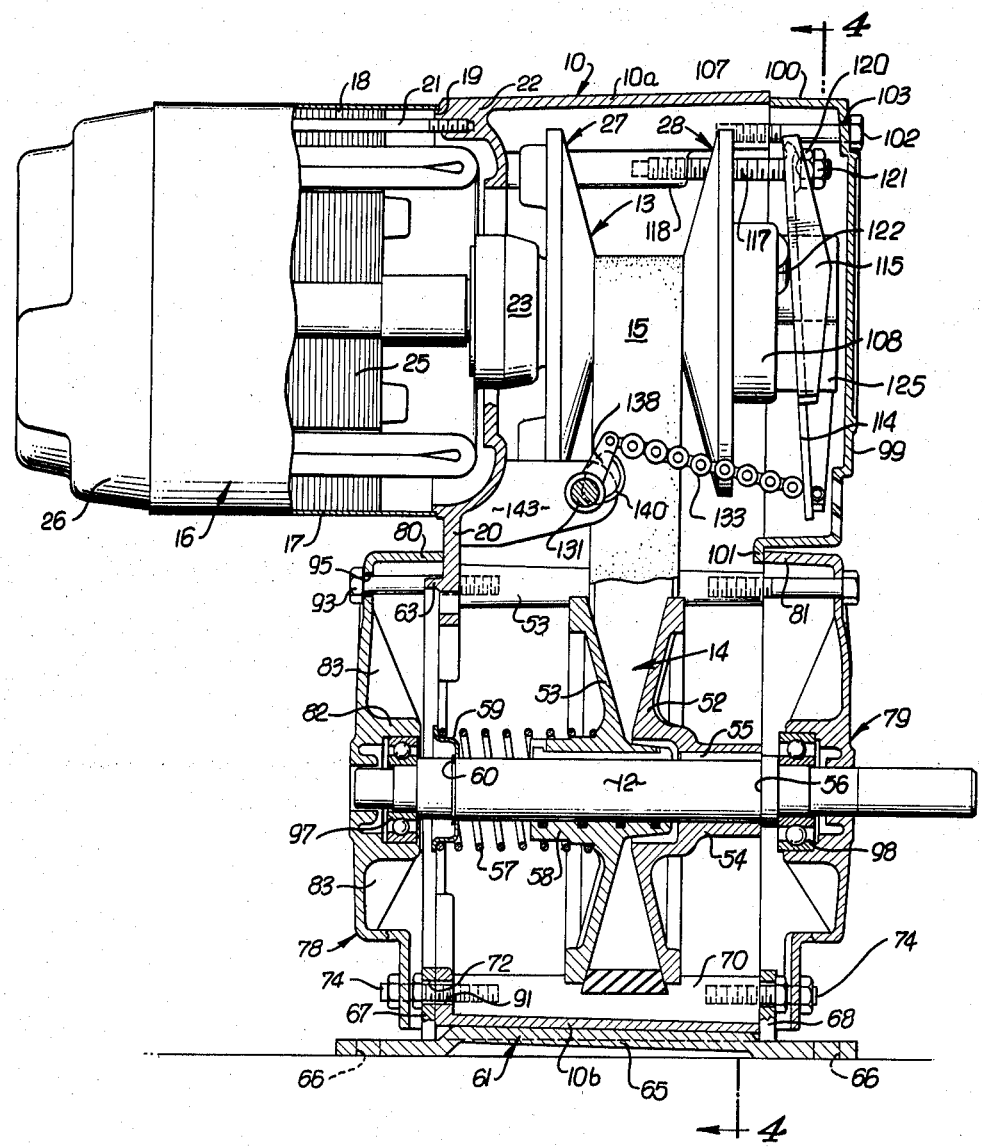
FIG. 3 is an enlarged axial sectional view taken along an offset plane corresponding to line 3—3 of FIG. 2, some of the parts being shown in elevation.
Figure 4:
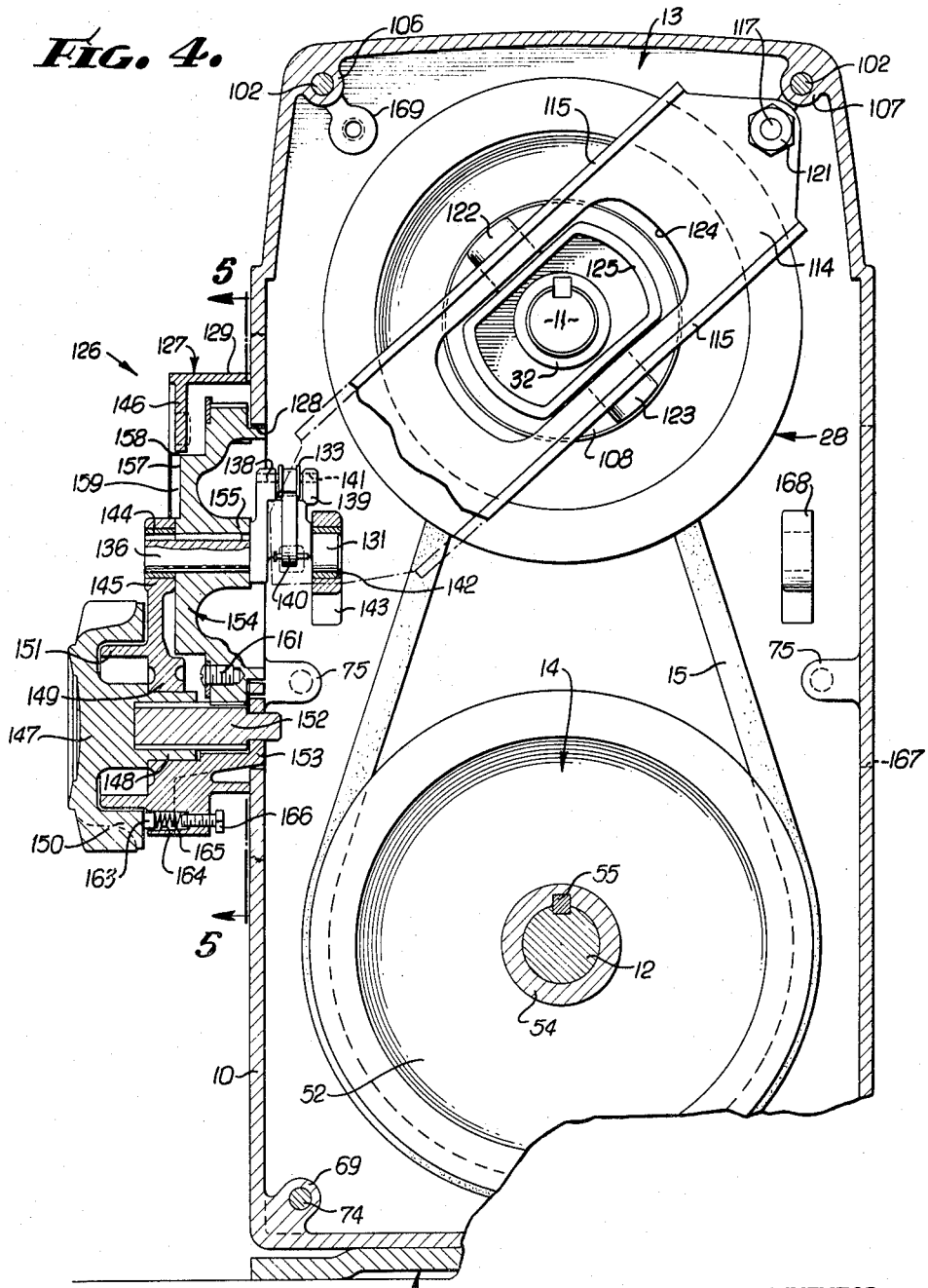
FIG. 4 is a fragmentary transverse sectional view taken along a plane corresponding to line 4—4 of FIG. 3.
Figure 8:
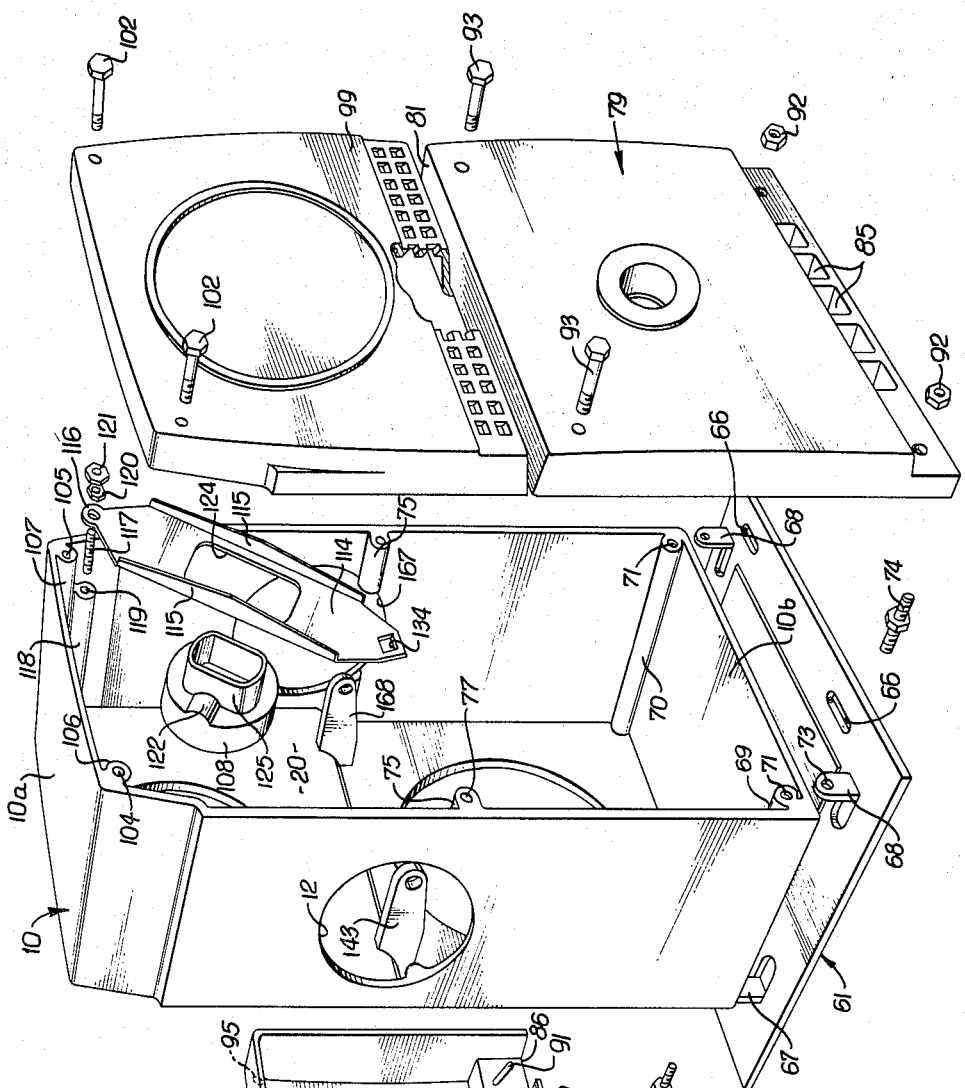
FIG. 8 is an exploded pictorial view illustrating the various elements of the frame.

In FIGS. 1, 2, 3, 4 and 8, there is illustrated a frame or casing 10 for a variable ratio transmission mechanism. As shown in FIGS. 4 and 8, the frame is generally of rectangular configuration, and so designed that it may be made as a die casting. For this purpose, the right-hand end of the frame 10 is entirely open. The other end of the frame 10 is partially closed in a manner hereinafter to be described. As shown in FIG. 3, the upper and lower walls 10a and 10b as well as the side walls are tapered so as to provide suitable mold draft.

A driving shaft 11 (FIGS. 3 and 6) and a driven shaft 12 (FIGS. 1 and 3) are supported for movement about spaced parallel axes in a manner hereinafter to be described. The shafts are connected together by the aid of variable diameter pulley structures 13 and 14 respectively mounted upon the shafts 11 and 12. A flexible V-belt 15 interconnects the pulley structures 13 and 14.

The shaft 11 is operated by a motor 16 cantilevered at the left-hand end of the frame 10, as viewed in FIGS. 1 and 3. The motor includes a shell 17 in which stator laminations 18 are accommodated. The shell 17 telescopes over an annular flange or register 19 formed on the left-hand end wall 20 of the frame. A series of bolts 21 engaging threaded recesses 22 on the flange 19 secure the motor 16.

A bearing cup 23 (FIGS. 3 and 6) is integrally formed at the left-hand wall of the frame. The shaft 11 projects through a bearing 24 mounted in the cup. On the outer end of the shaft a rotor 25 is mounted. A bearing structure (not shown) is mounted in an end bracket 26 at the opposite end of the motor 16. The right-hand end of the shaft, as shown in FIG. 6, is free of direct support.

The pulley structure 13 on the driving shaft 11 includes, in this instance, a pair of opposed pulley elements 27 and 28, one of which 28 is slidable along the shaft 11. The edges of the belt 15 engage the conical faces of the respective pulley elements. As the pulley sections 27 and 28 are moved toward and away from each other, the belt 15 is forced outwardly or permitted to move inwardly, thus changing the effective pulley diameter.

Figure 6:
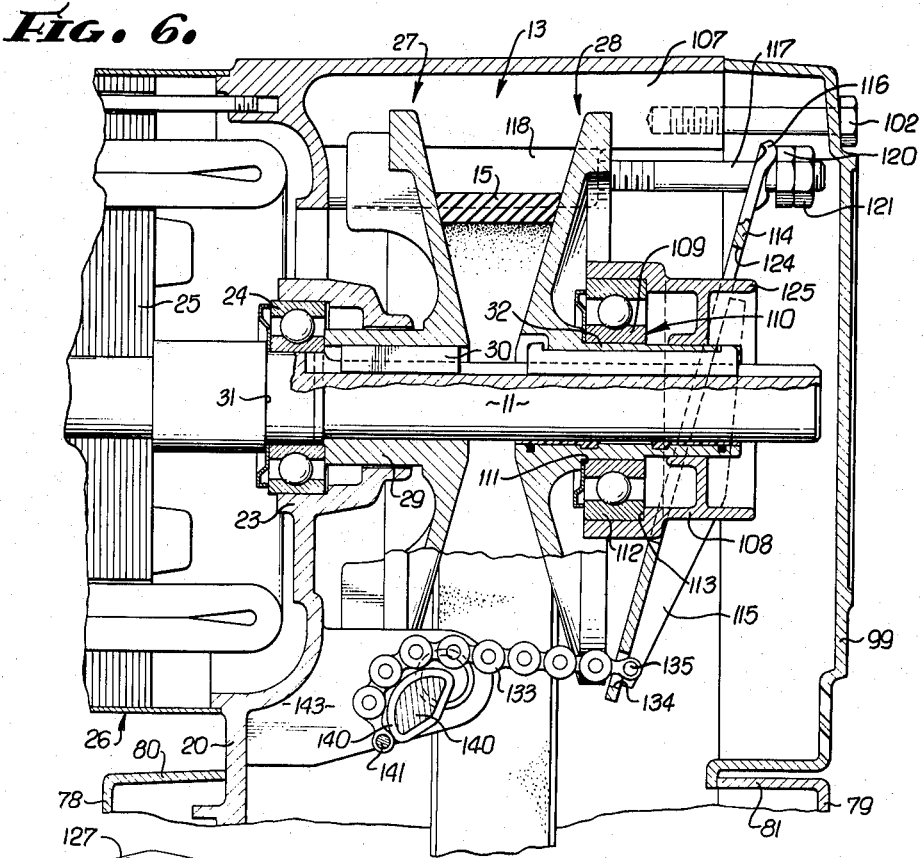
FIG. 6 is an enlarged fragmentary axial sectional view showing a part of the apparatus illustrated in FIG. 3 and with the parts in a different position.

The left-hand pulley element 27, as shown in FIG. 6, has a hub 29 that fits the shaft 11. A key 30 establishes a driving connection between the shaft 11 and the pulley element 27. The hub 29 projects into the bearing cup 23 and abuts the inner race of the bearing 24. The inner race of the bearing 24 in turn abuts a shoulder 31 formed on the shaft 11.

The right-hand pulley element 28 has a hub 32 shown in detail in FIG. 12. Located between the hub 32 and the shaft 11 are companion flexible bushings 33 and 34 similar to those shown and described in the application of Vito Raso et al., Serial No. 140,520 filed September 25, 1961, now Patent No. 3,138,032, and entitled "Axially Adjustable Drive Mechanism." The bushings 33 and 34 may be made of Nylatron, Delrin or other material having a relatively low coefficient of friction with respect to the metal of the shaft 11. The bushings 33 and 34 respectively have axially extending slots 35 and 36 capable of alignment with keyways 37 and 38 respectively formed on the interior surface of the hub 32 and the exterior surface of the shaft 11.

The bushing structures 33 and 34 are received in opposite ends of the hub 32. Their inner ends have integral collars 39 and 40 that are keyed in annular internal recesses 41 and 42 of the hub 32. A key 43 made of metal or plastic is accommodated in the keyways 37-38 and extends through the slots 35 and 36. The key 43 is locked to the hub 32. For this purpose, enlarged ends 44 and 45 of the key 43 project into recesses 46 and 47 at opposite ends of the hub 32.

The bushings 33 and 34 may be compressed so as to enable the collars 39 and 40 to enter the bore of the hub 32 and to snap into the recesses 41 and 42. The bushings 33 and 34 are sufficiently flexible so as to permit their constriction for purposes of assembly. Yet the bushings may have resilient characteristics so that their expanding force normally keeps them in place. However, in order to ensure a close fit of the bushings on the shaft 11 thus to hold the pulley element 28 against tilting or any movement relative to the shaft 11 except in an axial direction, the bushings 33 and 34 are constricted about the shaft 11. For this purpose, split O-rings 48 and 49 are provided. These O-rings, which may be made of rubber-like material such as neoprene or of other suitable material, are accommodated in internal grooves 50 and 51 at opposite ends of the bore of the hub 32. The normal diameter of the rings 48 and 49 is slightly greater than the depth of the respective grooves 50 and 51. Accordingly, the rings 48 and 49 provide a constricting force on the bushings 33 and 34, thus ensuring a close fit between the pulley element itself and the shaft 11. The split in the rings 48 and 49 allows for passage of the key 43, as shown in FIG. 15. The rings 48 and 49 may be located at other positions along the bushings, or additional rings may be provided if desired.

The manner in which the pulley section 38 is moved axially will be described hereinafter.

The driven shaft 12, as shown in FIG. 3, has pulley elements 52 and 53. The right-hand pulley element 52 has a hub 54 that fits the shaft 12 and is coupled thereto, as by a key 55. The right-hand end of the hub 54 abuts a shoulder 56 formed on the shaft 12. The left-hand pulley structure 53 is mounted by a two-part bushing similar to that described in connection with the pulley element 28. A compression spring 57, which surrounds both the shaft 12 and the hub 58 of the pulley element 53, urges the pulley element 53 toward the companion pulley element 52. A spring retainer 59 that abuts a snap ring 60 mounted upon the shaft 12 forms a seat for the spring 57. In a well-understood manner, the pulley section 53 automatically adjusts to the setting of the pulley elements 27 and 28 on the driving shaft 11.

The frame 10 itself has no base, mounting flange or mounting brackets. It may be mounted upon a separate base 61 or it may be mounted, as illustrated in FIG. 9, upon auxiliary equipment, such as a right-angle drive 62. The left-hand end wall 20 of the frame 10, as shown in FIG. 3, is provided with an annular flange or register 63 coaxial with the shaft 12. This flange 63 may be received within an annular groove formed on the frame 64 of the auxiliary mechanism 62 shown in FIG. 9. In a well-understood manner, the driven shaft of the variable ratio transmission mechanism is coupled to the input shaft of the auxiliary mechanism 62.

The angular position of the frame 10 about the auxiliary mechanism 62 may be adjusted.

In other installations, such as depicted in FIGS. 1 to 7, it may be desirable independently to mount the frame 10. The base 61 accomplishes this result. The base 61, which may be made of steel, is generally rectangular in configuration, as shown in FIG. 8. It has a central pad 65 (see also FIG. 3) that slopes slightly relative to the plane of the base 61. The end wall 10b rests upon the inclined pad 65. The plate 61 has a series of elongated apertures 66 (FIG. 8) through which suitable mounting bolts can be passed so as to secure the base to a suitable support.

The base 61 has four stamped-out projections or ears located beyond the corners of the pad 65. Two of the ears 67 overlie the edges at the left-hand lower corners of the frame 10, and the other two ears 68 overlie the edges at the right-hand open end of the frame 10.

Extending along the corners within the frame 10 are bosses 69 and 70. These bosses 69 and 70 have apertures 71 at opposite ends accessible at the end wall 20 and the opening of the frame. These apertures 71 are capable of registry with apertures 72 and 73 of the ears 67 and 68, respectively. By the aid of hex-collared studs, as at 74, the frame 10 is secured to the base 61.

Two bosses 75 and 76 extend along the interior of the frame at the mid-level thereof and have apertures 77 at opposite ends accessible, respectively, at the end wall 20 and the opposite open end of the frame. The apertures 77 and 71 at each end of the machine are located at corners of a square. Thus it is possible to mount the frame on a base not only in the vertical position illustrated in FIGS. 1 to 8, but also in either a right- or left-hand horizontal orientation. A right-hand orientation is depicted in FIGS. 13 and 14.

The apertured bosses 69, 70, 75 and 76 mount bearing brackets 78 and 79 for opposite ends of the driven shaft 12. The brackets 78 and 79 are identical and may be made from the same casting. They are generally of square configuration. The end brackets 78 and 79 have peripheral flanges 80 and 81 adapted to abut the ends of the frame 10.

The inside of one of the brackets 78 is shown clearly in FIG. 8. A bearing cup 82 is located at the center of the bracket 78 on the inside thereof. Ribs 83 reinforce the cup. One side of the bracket has an inwardly offset angular wall 84 along which ventilating openings 85 are situated. The edges of the flange 80 are arrayed substantially as a square, there being slots 86 and 87 at the corners of the flange along the offset wall 84. Ribs 88 define the separation between the ventilating openings 85 and serve to support the flange section 89 located between the slots 86 and 87.

The edges of the bracket 78 abut the end wall 20 and circumscribe the register or flange 63, which, in this instance, is unused. The lugs or ears 67 of the base 61 project through the slots 86 and 87 so as to be concealed by the bracket 78.

The hex-collared studs 74, which project outwardly from the bosses 69 and 70, pass through apertures 90 and 91 in the vertical portion of the offset wall 84. Nuts 92 secure the bracket to the hex-collared studs 74.

Cap screws 93 (see, for example, FIGS. 1 and 3) pass through apertures 94 and 95 at the other two corners of the bracket 78 and engage the apertures 77 of the frame. The center of the bearing cup 82 must be accurately located in order suitably to align the driven shaft 12. For this purpose, the apertures 77 and 71 in the bosses are accurately located. The aperture 94 at one corner of the bracket 78 is extended through a boss 96 (FIG. 8) located along the corner of the flange 80. The boss 96 has an end surface adapted to abut the wall 20 about the corresponding aperture 77. Thus the aperture 94 has a substantially axial extent and it is sized so as guidingly to fit the shank of the bolt 93. Accordingly, one corner of the bracket is accurately located on the frame.

The aperture 91 opposite the boss 96 is elongated along the line joining the center of the bearing cup 82 and the center of the aperture 94. The width of the slot is carefully sized so as closely to fit the end of the corresponding stud 74. The aperture 91 thus ensures precise alignment of the center of the bearing cup 82. The screw 93 for the aperture 95 and the nut for the end of the stud 74 at the opposite corner are readily positioned and serve firmly to clamp the bracket in place.

The opposite bracket 79, instead of engaging an end wall, has the edges of its flange 81 engaging along the edges at the open end of the case or frame 10. The bracket 79 is accurately located in an indentical manner, and the shaft 12 is thus accurately positioned by bearing structure 97 and 98 (FIG. 3) accommodated in the cups of the bearing brackets 78 and 79. The bracket 79 conceals the ears 68 of the mounting base 61.

The bracket 79 covers only about half of the frame opening. In order to complete the enclosure thereof, a cap 99 is provided. The cap 99 has a peripheral flange 100, three sides of which fall along the side and top edges at the open end of the frame 10. The fourth side of the flange 100 is extended to provide a lip 101 caught by the edge of the flange 81 of the bracket 79. Machine screws 102 extend through apertures 103 in the upper corners of the cap 99 and enter apertures 104 and 105 (FIG. 8) formed in bosses 106 and 107 at the upper-corners of the frame 10. The enclosure for the frame is thus completed.

For a right-hand or left-hand mounting of the frame on the base 61 and as shown in FIGS. 10 and 11, brackets 78 and 79 are turned ninety degrees so that the slots, as at 86 and 87, encompass the ears 67 and 68 of the base.

In order to adjust the transmission mechanism, the pulley element 28 carries a shift collar 108 (FIGS. 3 and 6). The shift collar 108 is telescoped over the hub 32. The inner race 109 of a ball bearing structure 110 is mounted upon the hub 32 and in abutting engagement with a shoulder 111. The outer race 112 of the bearing 110 is accommodated in an enlarged opening at the left-hand end of the collar 108 and in abutting relationship with an oppositely facing shoulder 113 formed therein. Thus, by virtue of the bearing structure 110, the shift collar 108 may be non-rotary; yet a connection between the collar and the pulley element 28 is established for its axial movement.

In order to increase the diameter of the pulley structure 13, the collar 108 is moved to the left. The thrust is so transmitted through the bearing structure 110 and the flexible belt 15 is caused accordingly to move. By relieving the thrust on the collar 108, the tension of the belt 15 causes the pulley element 28 to move to the right.

In order to control the movement of the collar 108, a shift lever 114 is provided. The lever 114 has reinforcing flanges 115 along opposite sides. One end of the lever has an apertured bearing projection 116 that forms a fulcrum for the lever 114. The projection 116 is mounted upon an outwardly extending stud 117 located at one of the upper corners of the frame 10. A supplemental boss 118, parallel to and terminating inwardly of the boss 107, provides an aperture 119 for mounting the stud 117. The apertured projection 116 bears against the inner surface of a nut 120 held in place by a lock nut 121. The lever 114 extends diagonally downwardly from the upper fulcrum corner, as illustrated in FIG. 4, and the central portion of the lever engages outwardly facing bearing projections 122 and 123 formed on the shift collars 108 on opposite sides of the axis of the shaft 11. The end of the lever 114 opposite the fulcrum 116, by means presently to be described, is moved inwardly or permitted to move outwardly, thus causing the shift collar 108 to adjust the pulley structure 113.

The shift lever 114 terminates adjacent the side wall opposite that at which it is fulcrumed. This end is movable between the pisitions illustrated in FIGS. 3 and 6, respectively. When the shift lever 114 is moved outwardly, as in FIG. 3, the pulley has a minimum effective diameter and the end of the lever is located in the cap 99. When the lever 114 is moved inwardly to the position of FIG. 6, the diameter of the pulley structure 13 is maximum and the end of the lever has moved inwardly along the side wall of the frame 10.

The bearing projections 122 and 123 are maintained substantially in appropriate angular position on opposite sides of the lever 114. For this purpose and for the purpose of holding the lever in its diagonal operative position, the collar 108 has a non-circular flange 125 that projects with slight clearance through a corresponding non-circular aperture 124 in the center of the lever 114. The collar 108 and the lever 114 are thus mutually restrained.

In order to move the lever 114, a control unit 126 (FIGS. 1, 4, 5 and 7) is provided. The control unit 126 includes a housing structure 127 that is secured about an aperture 128 in the side wall of the frame 10. This aperture is located substantially at the center of the frame about midway between the levels of the driving shaft 11 and the driven shaft 12. The center of the aperture 128 is located beyond the inward terminus of the path of movement of the end of the shifting lever 114.

The housing structure 127, as shown in FIGS. 1 and 5, is generally square. It has a peripheral flange 129 that engages the surface of the side wall of the frame 10 about the openings 128 and is fastened thereto by the aid of a plurality of screws 130 (FIGS. 1 and 5).

A crankshaft 131 serves to move the shift lever 114. Thus the crankshaft 131 has an intermediate crank portion 132 which one end of a sprocket chain 133 is secured. The other end of the sprocket chain 133 passes through a small square aperture 134 in the shift lever 114 (FIG. 7). A pin 135 passing through the end link of the chain secures the chain to the lever 114. The chain 133 extends along the inside of the frame 10 with suitable clearance.

The pin 135 is located in line with the center of the shift collar 108 and the bearing projection 113. The lever 114 is free to rock about this line so that the thrust on the lever 114 is distributed equally to the bearing projections 122 and 123. Accordingly the shifting collar 108 has no tendency to tilt or bind.

The crankshaft 131 may be made as a die cast unit. The crankshaft 131 has two shaft parts 136 and 137 that are spaced from each other and joined by the crank part 132. The crank part 132 includes spaced ears 138 and 139 respectively attached to the shaft parts 136 and 137. A cam or toothless sprocket 140 is located between the ears 138 and 139 with its base and is integrally joined thereto. The end link of the sprocket chain 133 has its spacer collar and pin removed so that the parts of the end link are received within slots formed between the cam or toothless sprocket 140 and the respective ears 138 and 139. A pin 141 (FIGS. 3 and 4) is accommodated in both ears 138 and 139 and passes through the parts of the end link as well as through the cam part 140 to establish a suitable connection.

As illustrated in FIG. 6, the sprocket chain 133 wraps about the surface of the cam part 140 as the crankshaft 131 is rotated in a counterclockwise direction. The distance of the cam part from the axis of the crankshaft 131 is maximum at the place of connection of the chain 133. This distance gradually reduces. The configuration of the cam may be designed that the ratio of transmission may be any desired function of angular position of the crankshaft 131. For example, a linear relationship may be achieved.

The crankshaft part 137 is received in a bushing 142 in turn mounted in an arm 143 (see FIG. 3) projecting inwardly from the end wall 20 of the frame. The other part 136 of the crankshaft is extended axially and is mounted in a bearing bushing 144 in turn carried in an embossment 145 on the frontal wall 146 of the control unit housing 127.

In order to operate the crankshaft 131, a knob 147 (FIG. 4) is provided. The knob 147, which may be of die cast construction, has a reduced hub 148 that is journalled in an apertured boss 149 (see also FIG. 7) formed in the front wall 146 below the boss 145. The knob 147 has a peripheral flange 150 (FIG. 4) that telescopes over an outwardly projecting flange 151 formed on the housing 127.

Press-fitted in the hub 148 of the knob 147 is a pinion 152. The reduced end of the pinion 152 is journalled in an inwardly extending wall portion 153 (see also FIG. 5) of the housing 127. Ends of the teeth of the pinion 152 interfit grooves formed in the end of the knob hub 148 in order to establish a rotary coupling therebetween. A gear 154 is mounted in the housing 127 behind the frontal wall 146 and upon the crankshaft part 136 that meshes with the pinion 152. The gear 154, which may also be of die-cast construction, has a hub 155 keyed to the crankshaft part 136.

The angular position of the crankshaft 136 determines the setting of the variable ratio transmission mechanism. For purposes of indicating this setting, the gear 154 has a frontal surface 157 visible at a generally circular aperture 158 formed in the front wall 146 of the housing 127 about the boss 145. This surface 157 of the gear has a recess 159 (see also FIGS. 1 and 7) formed as a pointer to cooperate with scale markings on the housing wall 146 about the aperture 158.

In order to calibrate the indicator, the fulcrum point of the lever 148 may be shifted, as by adjustment of the nuts 120 and 131. For purposes of initial adjustment, the belt 15 is permitted to move to the minimum diameter position where it still adequately engages the pulley elements. The pointer is set at the zero scale mark. With all of the slack of the chain 133 taken up, the fulcrum point of the lever 144 is determined and set.

In order to prevent the belt from moving inwardly of the pulley structures beyond the minimum setting, a stop ring 160 is provided. The stop ring 160 is secured to the side face of the gear 154 by the aid of a plurality of clamping screws 161 (see FIGS. 4 and 7). The ring 160 has a projection 162 that extends above the root diameter of the teeth of the gear 146 and thus in a position to engage the teeth of the pinion 152 upon rotation of the gear 154. Thus the limit of movement of the gear is determined.

In order to maintain the setting determined by the knob 147 against creep, as for example induced by vibration, a small friction plug 163 is accommodated in an outwardly facing recess 164 in the lower wall 153 of the housing 147. The surface of the flange knob 150 is opposed to the recess 164 so as to be engaged by the plug 163. A small compression spring 165 in the recess urges the plug outwardly and to engage the knob 147. The screw 166, accessible behind the wall 153, adjusts the tension of the spring 165.

The control unit 126 can be mounted at either side of the frame 10, depending upon the requirements of the particular installation. For this purpose, an aperture 167, shown in dotted lines in FIG. 4, may be provided. A bearing arm 168 is provided in the frame casting for use, in this instance, for mounting the crankshaft. In this instance, the arm 143 will be idle. The shifting lever 114 is then mounted at the opposite upper corner of the frame 10, as at an apertured embossment 169. In this instance, the crankshaft 131 is angularly shifted through an angle of 180° relative to the gear 154. The gear 154 may be provided with two keyways for purposes of such selection. In either installation, clockwise movement of the crankshaft 131 decreases speed; hence the dials and pointer operate appropriately in both cases.

In the form of the invention illustrated in FIG. 16, a control unit 170 has a crankshaft 171 upon which a toothed crank or sprocket 172 is formed for cooperation with the chain 173. By the aid of the teeth formed on the sprocket 172, a more positive coupling is effected and the load is distributed.

The sprocket teeth are non-circularly oriented so that equal angular increments of movement of the shaft 171 result in equal changes in the ratio of transmission.

A machine screw 175 passes through an aperture in the sprocket 172 and accomplishes a positive coupling to a reducer gear 176. Furthermore, the sprocket 172 is thus angularly positioned relative to a pointer 177 mounted upon the gear 176. The control unit case has a recess in which a spring-pressed friction plug may be received as in the previous form.

In the form of the invention in FIG. 17 a coiled clock spring 178 is provided that reduces the effort required to operate the control unit. The clock spring 178 surrounds the hub 179 formed on the reducing gear 180. The inner end 181 of the spring 178 is bent radially inwardly to engage a slot formed in the hub. The outer end of the spring is bent outwardly to engage a slot formed in the case 182 of the control unit 183.

The spring 178 is so wound as to exert a torque on the sprocket 184 opposed to the chain tension and substantially balance the system. A knob-operated pinion 185 readily accomplishes movement of the gear 180. Since the torque on the gear 180 is substantially balanced by the spring 178, the reaction on the pinion 185 is slight; thus the pinion 185 readily holds the gear 180 is adjusted position. A spring-pressed brake plug may be provided as in the previous forms.

In the form illustrated in FIGS. 18 and 19, a control unit 186 is attached to the side wall 187 of a transmission frame. The control unit includes a hollow housing 188 open at one end. The edges 188a at the opening abut the frame wall 187 and surround a small apertured bearing boss 189 formed in the wall. Journalled in the boss is a hollow shaft 190 on the inner side of which a crank 191 is mounted. The crank 191, as shown in FIG. 13, is connected to a shifting lever 192 by the aid of a link 192a. A fulcrum for the lever 192 is provided by a machine screw 193 mounted at an apertured boss of the frame. Spacer washers 194 are interposed between the end of the shifting lever 192 and the head of the screw.

The link 192a is pivotally connected at one end to the crank 191 and at the opposite end to the shifting lever 192. The link 192a is formed as a rod with bent ends. One end extends through an aperture 195 in the end of the crank 191 and the other end extends through a transverse ear 196 formed on the end of the shifting lever 192.

The shifting lever 192, instead of bearing directly against the projections 197 and 198 of the shifting collar 199, is connected thereto by a pair of U-shaped links 200 and 201. Corresponding first ends of the links 200 and 201 are respectively mounted at apertures in the reinforcing flanges 202 and 203 of the shifting lever. The second corresponding ends of the links 200 and 201 are received in apertures formed in the outer side faces of the projections 197 and 198.

Angular movement of the crank 191 is effective to move the shift lever 192 but to a degree dependent upon the angular position of the crank 191. Thus when the pulley structure 204 is in the minimum diameter position illustrated, the crank 191 is at right angles to the link 192a and a given angular movement of the crank 191 produces a substantial axial movement of the shifting collar 199. However, as the crank 191 is rotated in a clockwise direction, the crank 191 moves toward parallel relationship with the link 192a and the axial movement of the shift collar 199 for the same angular movement of the crank 191 becomes less. The ratio of transmission changes substantially as a parabolic function of the axial position of the shift collar 199, and the movement of the link 192a occasioned by rotation of the crank 191 is substantially a cosine function. By suitably choosing the crank size, these functions substantially approximate each other such that equal changes in the ratio of transmission result upon equal angular increments of movement of the crank 191.

In order to rotate the crank 191 and the hollow shaft 190 to which it is attached, a gear 205 is provided that is keyed to the outer end of the hollow shaft 191 adjacent the boss 189. A snap ring 206 secures the gear 205 against axial movement along the shaft 190.

The gear 205 has an enlarged, substantially cylindrical flange 207 in which an internal ring gear element 208 is formed. The gear 208 is operated by a planetary gear 209 and a stationary ring gear 210 formed on the front wall 211 of the control unit 186.

The stationary ring gear 210 is coaxial with the gear element 208 and has the same pitch diameter but a slightly different number of teeth. The planetary gear 209 meshes with both ring gears and is supported for planetary movement about the axis of the device. The gear 205 accordingly is slowly rotated as planetary movement is imparted to the gear 209.

The planetary gear 209 is mounted on the inside of a cap portion 211 of a handle 212. For this purpose, a pin 213 is press-fitted in an eccentric boss 214 formed on the inside of the cap 211. The cap 211 has a peripheral flange 215 that telescopes over an annular register former peripherally of the gear 210.

The cap 211 is in turn rotatably supported on the outer end of a pin 216. The inner end of the pin 216 is journalled in the hollow shaft 190. Interposed between the pin 216 and a central boss 217 of the cap 211 is the hollow shank 218 of a supplemental knob 219. The knob 219 is positioned at the center of the cap 211.

The cap 211 and thus the pin 213 upon which the planetary gear 209 is mounted are rotated about the common axis of the device by the aid of a knob mounted at the end of an arm 220 formed integrally with the cap 211.

It is the angular position of the planetary gear 209 about the common axis of the device that directly determines the position of the crank 191. The knob 219 is adapted to provide a fine adjustment to the position of the planetary gear 209. Thus, on the shank 218 of the knob 219 is a sun gear 221 that meshes with the planetary gear 209. The sun gear 221 has an effective diameter of approximately half that of the planetary gear 209. By rotating the knob 219, planetary movement of the planetary gear 209 results and a very fine adjustment is achieved.

In order to indicate the position of the gear 205 and thus the ratio of transmission, the gear 205 carries a pointer 222 on an arm 223 projecting radially from the gear 205. The arm 223 is located just within the wall 211 and the pointer 222 sweeps along an arcuate recess 224 in the front wall 211. Scale indications (not shown) on the front wall 211 cooperate with the pointer 222.

In the form of the invention illustrated in FIGS. 20 and 21, a control unit 225 is provided that is mounted at an aperture 226 in the side wall 227 of the transmission frame. The control unit 225 includes the hollow case 228 on the front wall 229 of which is formed a bearing bushing 230. Supported in the bearing bushing is a crankshaft 231. The crankshaft 231 has a crank portion 232 providing a clevis to which a rod or chain (not shown) may be attached for moving a shifting lever such as described in connection with the previous forms.

The crankshaft 231 carries a gear 233 that meshes with a pinion 234. The pinion 234 is press-fitted in the hollow shank 235 of a handle 236. The shank 235 is in turn supported in an apertured bushing 237 formed in the front wall 229 below the bushing 230. The pinion 234 has a reduced cylindrical extension 238 that is piloted in an aperture 239 formed in an inwardly offset walled portion 240 of the case 228. By rotating the handle 236, as by a knob 241, the gear 233 and crankshaft 231 are rotated and the transmission ratio is adjusted.

It is the angular position of the pinion 235 and the handle 241 that determines the ratio of transmission. In order to provide a fine adjustment to the angular position of the handle 236, a supplementary knob 242 is provided. The knob 242 is supported for rotation about an axis eccentric of the handle 236. The knob 242 is attached to the outer end of a gear member 243 that projects through the handle 236. A tapered bearing bushing 244 mounted in a stepped recess 245 of the handle 236 supports the gear member 243 for rotation. A flange 246 formed at the center of the gear member 243 is seated at an enlarged inner end of the bushing 244 and prevents outward movement of the gear member. The portion of the gear member located outwardly of the flange 246 is cylindrical for cooperation with the bushing 244 while the portion located inwardly of the flange is toothed to form a pinion gear element.

This gear element engages a non-rotary sun gear formed peripherally on a flange 247 of the case 228. The flange 247 lies between the peripheral flange 248 of the handle 236 and its shank 235. By rotating the knob 242, planetary motion thereof results and the handle 236, in which the pinion is journalled, is correspondingly rotated. Thus a fine adjustment to the position of the crank 231 is achieved.

The gear 233 has a pointer 249 formed thereon that cooperates with scale markings surrounding a generally circular aperture 250 formed in the front wall of the case. A pointer 251 formed on the supplementary knob 242 cooperates with scale indications on a plate 252 attached to the outer surface of the handle 236. By suitably choosing gear ratios, one rotation of the supplemental knob 242 relative to the dial plate 252 corresponds precisely to movement of the pointer 249 between its successive scale indications. The ratio of gear reduction from knob 242 to crankshaft 231 is so great that additional friction means for preventing creeping movement may be unnecessary.

In the form of the invention illustrated in FIGS. 22 and 23, the control unit 270 slidably supports a rack gear 271 that moves along the inside wall 272 of the transmission frame in a direction parallel to the driving shaft 273. A shift collar 274 is operated by a shift lever 275 that has an end 276 projecting into a recess 277 formed at the end of the rack 271. By moving the rack 271 in its path parallel to the axis of the driving shaft 273, the shift collar 274 is correspondingly moved and the transmission ratio is thus adjusted.

The rack 271 is slidably mounted in a guiding recess 278 formed in an inwardly offset center wall 279 of the control unit case 280. This wall 279 projects through a suitable opening in the frame wall 272. A pinion 281 mounted by the case 280 meshes with the teeth of the rack 271.

A reduction gear 282 formed integrally with the pinion 281 is operated by a driving gear 283 also supported by the case 280. The driving gear 283 is formed intermediate the ends of a shaft 284 journalled in the case 280. The shaft 284 has an end accessible frontally of the case for mounting of a knob (not shown).

The control unit case 280 provides a large frontally opening recess in which the gear structure 281–282 is received. This recess may be closed by a suitable plate (not shown) cooperable with apertured bosses 285 formed within corners on the case recess.

The angular position of the gear 281–282 indicates the setting of the transmission mechanism, and hence a pointer may be attached in a manner similar to that shown in the previous forms.

The control unit, as in the previous form, may be readily located at either side of the frame.

The cap 286, by engagement with the end of the rack, may determine the limit of movement of the control unit to the minimum diameter position. Hence, the rack 271 is readily removable with the shift lever 275 for access to the pulley structures. Optionally, stop means may be incorporated in the control unit.

The control unit case has a recess 287 in which a spring-pressed plug may be received as in the previous form.

In the form of the invention illustrated in FIG. 24, a variable diameter pulley structure 291 is provided that is similar to that illustrated in the previous forms. A shifting collar 292 is movable axially of a drive shaft 293 appropriately to position the edge-active belt 294. In the present instance, the pulley sections 295 and 296 may be moved apart to such an extent as to release the belt 294. In order to support the belt 294 and to prevent its being dragged by the driving shaft 293, an idler bearing sleeve 297 is provided. The sleeve 297 is mounted with running clearance on the shaft 293. A recess 298 accommodates the sleeve 297 when the pulley sections 295 and 296 are moved together.

A shifting lever 299 is provided that is similar to the shifting lever shown in the previous forms. The shifting lever 299, as before, extends diametrically of the shifting collar 292, with the flange 300 of the shifting collar 292 projecting through a central aperture 301 of the lever.

A fulcrum for the lever 299 is provided at the inner end of a threaded stud 302 that is mounted in a threaded bore 303 of an embossment 304 of a cap 305. The inner end of the screw 302 carries a pair of spaced collars 306 and 307 encompassing the apertured bearing projection 308 of the lever 299. The axis of the screw 302 is parallel to the shaft 293, and its outer end carries a handle 309 by the aid of which the screw 302 and thus the fulcrum point of the lever 299 can be moved inwardly or outwardly.

The screw 302 has a very substantial range of adjustment so that it is possible to vary the effective diameter of the pulley structure 291 by operation of the handle 309. In this instance, the lever 299 rocks about the end link of a chain 310 of the control unit 311 as a fulcrum point. Accordingly, the diameter of the pulley structure and hence the setting of the variable ratio transmission mechanism may be controlled by two inputs. The control unit 311, for example, may be operated automatically in response to system conditions, and the handle 309 may provide for a fine adjustment, a temporary adjustment, or for manual override in cases of emergency. Optionally, the handle 309 may be connected to another automatic control whereby the variable ratio transmission mechanism responds to the combination of two input variables.

In order to adapt a variable ratio transmission for this type of operation, it is merely necessary to provide the cap 30 having the apertured boss 304 together with the screw assembly.

In the present instance, the end link 310 is at the same distance from the central operative portion of the lever 299 as is the bearing projection 308. Hence, the respective inputs produce equal effects upon the effective pulley diameter. However, this arrangement can be modified.

In the form of the invention illustrated in FIG. 25, the bearing projection 321 is fulcrumed upon a post 322. In the present instance, the post 322 is in the form of a machine screw having a head 323 and a threaded end opposite the head. The threaded end is mounted by and projects through a threaded aperture 324 of a boss 325 formed on the cap or cover 326. The projecting end of the screw 322 is locked in an adjusted position by the aid of a nut 327. A sleeve 328 is slidably mounted upon the post 322 and is urged against the head 323 by the aid of a relatively heavy coil spring 329. The coil spring 329 acts upon an integral collar 330 formed intermediate the length of the sleeve 328. One end of the spring 329 surrounds the right-hand end of the sleeve 328, and the opposite end engages about the edges at the inner end of the threaded aperture 324. The lever bearing projection 321 fits the left-hand end of the sleeve 328, and the belt tension normally urges it against the collar 330.

The force exerted by the compression spring 329 is normally adequate to maintain the sleeve 328 against the head 323 throughout all operating conditions of the transmission whereby the fulcrum point of the lever is fixed. However, should an overload occur, as for example during starting, an excess thrust will be imposed upon the shift lever and the spring 329 will yield, permitting the lever to move to the right, thus relieving the control unit from the imposition of undue stress. As soon as the momentary overload has ceased, the spring 329 returns the sleeve 328 to its normal position against the head 323, and the fulcrum point for the lever is again determined.

The normal position of the fulcrum can be adjusted simply by changing the axial position of the screw or post 322.

The inventor claims:

1. In a variable ratio transmission mechanism: walls forming a frame; a shaft; means supporting the shaft for rotation in the frame, said shaft having an end free of support; a pulley structure mounted on said shaft, including a pulley element slidable along the free end of the shaft; a shifting lever; means forming a fulcrum for the lever at a place spaced from the shaft; said lever extending substantially diametrically across the free end of the shaft; a mechanism mounted on the frame for moving the free end of the lever in an arc substantially parallel to the shaft; a shift collar operatively connected to said pulley element; means supporting the shift collar for sliding movement along the shaft while the shift collar is non-rotary; said shift collar having a non-circular axial projection and bearing means on opposite sides of the projection; said lever having a non-circular aperture receiving said non-circular projection and engageable with said non-circular projection to restrain angular movement of said shift collar independently of said bearing means; said lever abutting said bearing means on opposite sides of said aperture to apply an axially directed force to said shift collar to limit outward movement of said shift collar along said shaft.

2. In a variable ratio transmission mechanism: walls forming a frame; a shaft; means supporting the shaft for rotation in the frame, said shaft having an end free of support; a pulley structure mounted on said shaft, including a pulley element slidable along the free end of the shaft; a shifting lever; means forming a fulcrum for the lever at a place spaced from the shaft; said lever extending substantially diametrically across the free end of the shaft; a mechanism mounted on the frame for moving the free end of the lever in an arc substantially parallel to the shaft; a shift collar operatively connected to said pulley element; means supporting the shift collar for sliding movement along the shaft while the shift collar is non-rotary; and a pair of links connecting the center of the lever to the shift collar for transmitting the lever thrust to the shift collar and maintaining the diametric orientation of the lever, the links being pivotally connected at corresponding first ends to the lever, and to the shift collar at their other corresponding ends, whereby the requisite degree of freedom is provided for connecting the arcuately movable lever and the axially movable shift collar.

3. In a variable ratio transmission mechanism: walls forming a frame; a shaft; means supporting the shaft for rotation in the frame, said shaft having an end free of support; said frame having an opening opposite the free end of said shaft; closure means for said opening; a pulley structure mounted on said shaft, including a pulley element slidable along the free end of the shaft and removable through said opening; a shifting lever; a post attached to said frame independently of said closure means and at a place spaced radially beyond said pulley element and laterally from the shaft; said lever having an aperture through which the post extends; means detachably mounted on the post for longitudinal adjustment thereon and against which the lever bears to form a fulcrum for the lever; said lever being detachable from said post and removable through said opening along with said fulcrum forming means; said lever extending substantially diametrically across the free end of the shaft; a mechanism mounted on the frame for moving the free end of the lever in an arc substantially parallel to the shaft; and means forming an operative connection between the lever and the pulley element.

4. In a variable ratio transmission mechanism: walls forming a frame; a shaft; means supporting the shaft for rotation in the frame, said shaft having an end free of support; a pulley structure mounted on said shaft, including a pulley element slidable along the free end of the shaft; a shifting lever; means forming a fulcrum for the lever at a place spaced from the shaft; said lever extending substantially diametrically across the free end of the shaft; a mechanism mounted on the frame for moving the free end of the lever in an arc substantially parallel to the shaft; means forming an operative connection between the lever and the pulley element; and means for adjusting the position of the fulcrum in a direction parallel to said shaft.

5. In a variable ratio transmission mechanism: walls forming a frame having an opening; a closure for said opening; a shaft; means supporting the shaft for rotation in the frame, said shaft having an end free of support located at said opening; a pulley structure mounted on said shaft, including a pulley element slidable along the free end of the shaft and removable through said opening; a shifting lever; means detachably connected to the frame independently of said closure forming a fulcrum for the lever at a place spaced from the shaft; said lever extending substantially diametrically across the free end of the shaft; a mechanism mounted on the frame independently of said closure for moving the free end of the lever in an arc substantially parallel to the shaft; means forming an operative connection between the lever and the pulley element; said pulley structure being removable through said opening upon detachment of said fulcrum means; and a non-bearing closure for said opening.

6. In a variable ratio transmission mechanism: walls forming a frame; a shaft; means supporting the shaft for rotation in the frame, said shaft having an end free of support; a pulley structure mounted on said shaft, including a pulley element slidable along the free end of the shaft; a shifting lever; means forming a fulcrum for the lever at a place spaced from the shaft; said lever extending substantially diametrically across the free end of the shaft; a crank mounted on a wall of the frame located laterally of the shaft; a link extending along the wall and connecting the crank and the free end of said lever; and means forming an operative connection between the lever and the pulley element; said crank being substantially perpendicular to said link when the pulley structure is at a minimum diameter position, and said crank, link and lever being connected together at places to cause the ratio of transmission to change substantially linearly with respect to angular movement of the crank.

7. In a variable ratio transmission mechanism: walls forming a frame; a shaft; means supporting the shaft for rotation in the frame, said shaft having an end free of support; a pulley structure mounted on said shaft, including a pulley element slidable along the free end of the shaft; a shifting lever; means forming a fulcrum for the lever at a place spaced from the shaft; said lever extending substantially diametrically across the free end of the shaft; a crank mounted on a wall of the frame located laterally of said shaft; a chain connecting the lever to the crank; means forming an operative connection between the lever and the pulley element; said crank having a surface along which the chain is wrapped as the crank is moved, said surface extending non-circularly about the axis of the crank so as to adjust the ratio of transmission as a function of the angular position of the crank.

8. In a variable ratio transmission mechanism: walls forming a frame; a shaft; means supporting the shaft for rotation in the frame, said shaft having an end free of support; a pulley structure mounted on said shaft, including a pulley element slidable along the free end of the shaft; a shifting lever; means forming a detachable fulcrum for the lever at a place spaced from the shaft; said lever extending substantially diametrically across the free end of the shaft; a crank mounted on a wall of the frame located laterally of said shaft; a chain detachably connecting the lever to the crank; means forming an operative connection between the lever and the pulley element; said crank having a surface along which the chain is wrapped as the crank is moved, said surface extending non-circularly about the axis of the crank so as to adjust the ratio of transmission as a linear function of the angular position of the crank; said pulley structure being confined on said shaft only by said lever.

9. In a variable ratio transmission mechanism: walls forming a frame; said frame having an opening; a shaft; means supporting the shaft for rotation in the frame, said shaft having an end free of support located at said opening; a pulley structure mounted on said shaft, including a pulley element slidable along the shaft; said frame having a pair of apertures at opposite side walls of the frame and angularly spaced from each other about the axis of the shaft; a fulcrum member mounted at one of the apertures; a shifting lever supported at one end by said fulcrum member; said lever extending substantially diametrically across the shaft and having a free end movable along the inside of the frame wall opposite that at which the fulcrum member is located; a manual control member mounted at said opposite side wall laterally of said shaft and connected to said free end of said shifting lever; and means forming an operative connection between the center of the shifting lever and said pulley element.

10. In a variable ratio transmission mechanism: walls forming a frame; a shaft; means supporting the shaft for rotation in the frame; a variable diameter pulley structure mounted on said shaft, including a pulley element slidable along the shaft; a flexible belt cooperating with the pulley structure; a control unit attached to the frame; an operating shaft member mounted by the control unit; a reduction gear member coupled to the shaft member; a manually operated driving gear member mounted by the control unit and engaging said reduction gear member; means connecting the shaft member and said pulley element for causing the pulley element to be axially positioned in accordance with the angular position of said shaft member; and a stop ring adjustably mounted on one of said gear members engageable with the other of said gear members to limit motion thereof to determine a minimum daimeter position of said pulley structure.

11. In a variable ratio transmission mechanism: walls forming a frame; a shaft; means supporting the shaft for rotation in the frame; a variable diameter pulley structure mounted on said shaft, including a pulley element slidable along the shaft; a flexible belt cooperating with the pulley structure; a control unit attached to the frame; an operating shaft member mounted by the control unit; a reduction gear member coupled to the shaft member; a manually operated driving gear member mounted by the control unit and engaging said reduction gear member; means connecting the shaft member and said pulley element for causing the pulley element to be axially positioned in accordance with the angular position of said shaft member; said connecting means including a shift lever extending substantially diametrically of said shaft to engage said pulley element; means adjustable in a direction parallel to the shaft, forming a fulcrum for the shift lever at a place spaced from the shaft; and a stop ring adjustably mounted on one of said gear members engageable with the other of said gear members to limit motion thereof to determine a minimum diameter position of said pulley structure.

12. In a variable ratio transmission mechanism: walls forming a frame; a shaft; means supporting the shaft for rotation in the frame; a pulley structure mounted on the shaft, including a pulley element slidable along the shaft to change the diameter of the pulley structure; a flexible belt engaging the pulley structure; an adjusting device attached to a wall of the frame, said adjusting device having an operating shaft; means forming an operative connection between the operating shaft and said pulley element for positioning the pulley element in accordance with the position of said shaft; an actuator for said shaft; and a balancing spring mounted by said adjusting device and opposing the thrust of said connection means to reduce the turning torque required to be exerted by said actuator for adjustment of said device.

13. In a variable ratio transmission mechanism: walls forming a frame; a shaft; means supporting the shaft for rotation in the frame; a pulley structure mounted on the shaft, including a pulley element slidable along the shaft to change the diameter of the pulley structure; a flexible belt engaging the pulley structure; an adjusting device attached to a wall of the frame, said adjusting device having an operating shaft; a shift lever; means forming a fulcrum for the lever at a place spaced from the shaft on a wall opposite the adjusting device; said lever extending substantially diametrically across the shaft, and having an end located adjacent said adjusting device; means forming an operative connection between the center of the lever and said pulley element; said adjusting device having an operating shaft; means connecting the end of the lever to said shaft for causing the pulley element to move in accordance with the angular position of said operating shaft; and a coiled spring surrounding said operating shaft and having an end acting upon said operating shaft for substantially balancing the thrust of said connecting means.

14. In a variable ratio transmission mechanism: walls forming a frame; a shaft; means supporting the shaft for rotation in the frame; a pulley structure mounted on the shaft, including a pulley element slidable along the shaft to change the diameter of the pulley structure; a flexible belt engaging the pulley structure; an adjusting device having a case attached to said frame; an operating shaft mounted on said case and having a part located in the frame; means forming a connection between said operating shaft and said pulley element; a pair of knobs mounted on the case; means forming different gear reduction connections between the knobs and the operating shaft to provide coarse and fine adjustments of the ratio of transmission.

15. In a variable ratio transmission mechanism: walls forming a frame; a shaft; means supporting the shaft for rotation in the frame; a pulley structure mounted on the shaft, including a pulley element slidable along the shaft to change the diameter of the pulley structure; a flexible belt engaging the pulley structure; an adjusting device having a case attached to said frame; an operating shaft mounted on said case and having a part located in the frame; means forming a connection between said operating shaft and said pulley element; a rotary internal ring gear carried by and coupled to the operating shaft; a non-rotary internal ring gear carried by the case coaxially of said rotary ring gear; a handle mounted on said case coaxially of said ring gear; a planetary gear mounted eccentrically of said handle and engaging both of said ring gears to impart rotation to said operating shaft upon angular movement of said handle; a sun gear mounted coaxially of said handle and engaging said planetary gear; and a knob for rotating said sun gear.

16. In a variable ratio transmission mechanism: walls forming a frame; a shaft; means supporting the shaft for rotation in the frame; a pulley structure mounted on the shaft, including a pulley element slidable along the shaft to change the diameter of the pulley structure; a flexible belt engaging the pulley structure; an adjusting device having a case attached to said frame; an operating shaft mounted on said case and having a part located in the frame; means forming a connection between said operating shaft and said pulley element; a reduction gear carried by said operating shaft; a pinion mounted on the case for rotating said reduction gear; a handle movable about an axis for rotating the pinion; a non-rotary gear attached to the case and extending coaxially of said handle; a planetary gear mounted eccentrically of the handle and engaging said non-rotary gear; and a knob connected to said handle.

17. In a variable ratio transmission mechanism: a shaft; means supporting the shaft for rotation about its axis; a pulley structure mounted on said shaft, including a pulley element slidable along the shaft; a shifting element for moving the pulley element along the shaft; means supporting the shifting element for rotation relative to the pulley element and about said axis; a lever; means forming a fulcrum for one end of the lever at a place spaced from the shaft; means for moving the other end of said lever and attached to said lever at a place in line with the said axis and said fulcrum; said lever being capable of limited tilting movement about said line as an axis; and a pair of spaced bearing means located substantially equidistantly on opposite sides of said axis for transmitting force from the lever to said shifting element, said lever being capable of tilting about said line as an axis to apply substantially equal forces to said pair of bearing means.

18. In a variable ratio transmission mechanism: a shaft; means supporting the shaft for rotation about its axis; a pulley structure mounted on said shaft, including a pulley element slidable along the shaft to vary the effective pulley diameter; a shifting lever extending diametrically of the shaft and having provisions engageable with pulley element for positioning the pulley element along the shaft; means for moving one end of the lever in a direction having a substantial component parallel to said axis and about the other end of the lever as a fulcrum point; and means for moving said other end of the lever in a direction having a substantial component parallel to said shaft and about said one end of said lever as a fulcrum point.

19. In a variable ratio transmission mechanism: a shaft; means supporting the shaft for rotation about its axis; a pulley structure mounted on said shaft, including a pulley element slidable along the shaft to vary the effective pulley diameter; a shifting lever extending diametrically of the shaft and having provisions engageable with pulley element for positioning the pulley element along the shaft; a post; means adjustably mounting the post in spaced relationship to said axis and for movement in a direction substantially parallel to said axis; means carried by the post for engagement with one end of said lever to form a fulcrum therefor; an operating handle for moving the post in its mounting means for shifting said fulcrum; and means engageable with the other end of the lever for moving the lever about said fulcrum to adjust the position of said pulley element.

20. In a variable ratio transmission mechanism: a shaft; means supporting the shaft for rotation about its axis; a pulley structure mounted on the shaft, and having a pair of pulley elements movable toward and away from each other; an edge active belt engaging said pulley elements and urging said pulley element apart; a lever extending substantially diametrically of said shaft for positioning one of said pulley elements to determine the effective diameter of said pulley structure; fulcrum means against which one end of said lever bears; means mounting said fulcrum means for movement in a path substantially parallel to said shaft; yielding spring means normally holding said fulcrum means at a preselected position in said path against the thrust of said lever; and control means for moving the other end of said lever about said fulcrum means.

21. In a variable ratio transmission mechanism: walls forming a frame; a shaft supported in the frame for rotation about an axis, said shaft having an end free of support; said frame having an opening opposite the free end of said shaft; closure means for said opening; a pulley structure mounted on said shaft, and cooperable with a pulley belt, said pulley structure including a pulley element slidable along the free end of the shaft and removable through said opening; a shift collar rotatably mounted on the shaft for moving said pulley inwardly of said free end; the tension of said pulley belt urging said pulley element and said shift collar outwardly of said free end; a shifting lever extending diametrically of said shaft and engaged by said shift collar; fulcrum means attached to said frame independently of said closure and abuting one end of said shifting lever to confine the said one end of said shifting lever against movement in a direction outwardly of said shaft end; flexible means carried by the frame and having an element abutting the other end of said shifting lever; and means mounted on said frame for paying out and winding up said flexible means to angularly move said shifting lever about its said fulcrum means whereby the shift collar and said pulley element are longitudinally shifted to change the pulley ratio.

22. In a variable ratio transmission mechanism: walls forming a frame; a shaft supported in the frame for rotation about an axis, said shaft having an end free of support; said frame having an opening opposite the free end of said shaft; closure means for said opening; a pulley structure mounted on said shaft, and cooperable with a pulley belt, said pulley structure including a pulley element slidable along the free end of the shaft and removable through said opening; a shift collar rotatably mounted on the shaft for moving said pulley inwardly of said free end; the tension of said pulley belt urging said pulley element and said shift collar outwardly of said free end; a shifting lever extending diametrically of said shaft and engaged by said shift collar; fulcrum means engaging one end of said shifting lever to confine the said one end of said shifting lever against movement in a direction outwardly of said shaft end; means adjustably mounting said fulcrum means on said frame independently of said closure to vary the position of said fulcrum means in a direction parallel to said shaft axis; and movable means carried by the frame and engaging the other end of said shifting lever to confine the said other end of said shifting lever against movement in said direction outwardly of said shaft end, movement of said movable means serving to angularly move said shifting lever about its said fulcrum means whereby the shift collar and said pulley element are longitudinally shifted to change the pulley ratio.

23. The combination as set forth in claim 22 in which said mounting means includes a post, and in which said lever has an aperture through which the post extends, said fulcrum means being carried by the post and engaging the lever about its said aperture.

References Cited by the Examiner

UNITED STATES PATENTS

| | | | |
|---|---|---|---|
| 2,277,004 | 3/1942 | Reeves | 74—230.17 |
| 2,770,978 | 11/1956 | Troemel | 74—230.17 |
| 3,009,363 | 11/1961 | Kohn et al. | 74—230.17 |
| 3,090,246 | 5/1963 | Berens | 74—230.17 |
| 3,111,858 | 11/1963 | Coutant | 74—230.17 |
| 3,136,169 | 6/1964 | Karger et al | 74—230.17 |

DON A. WAITE, *Primary Examiner.*

LEONARD H. GERIN, *Assistant Examiner.*